Aug. 14, 1945.  A. B. POOLE  2,382,333
SHADED-POLE SYNCHRONOUS ELECTRIC MOTOR
Filed May 3, 1944  3 Sheets-Sheet 1

INVENTOR
ARTHUR B. POOLE
By Seymour, Earle & Nichols
ATTORNEYS

Aug. 14, 1945.    A. B. POOLE    2,382,333
SHADED-POLE SYNCHRONOUS ELECTRIC MOTOR
Filed May 3, 1944    3 Sheets-Sheet 2
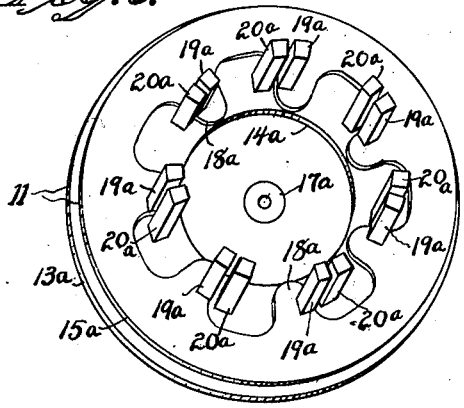
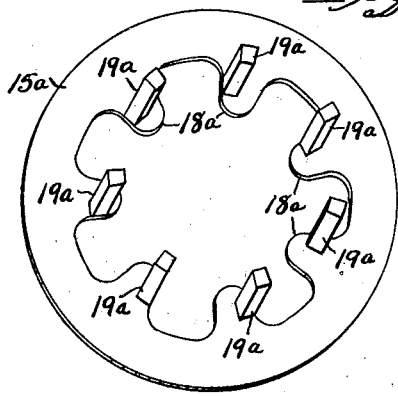
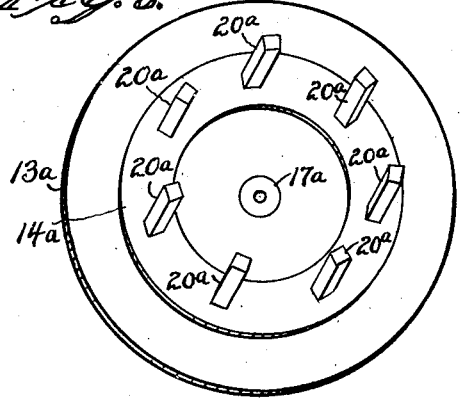
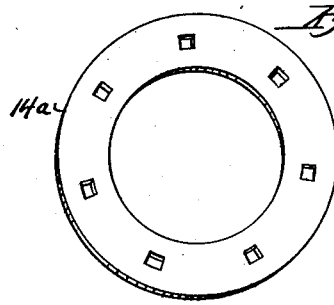
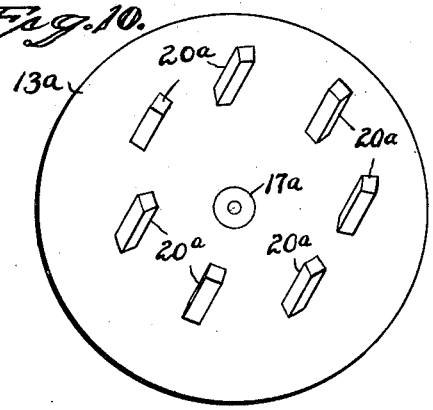
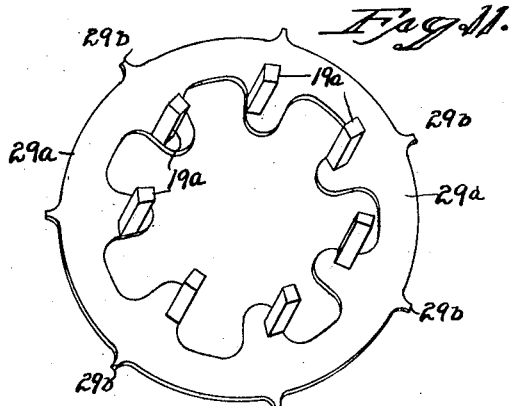
INVENTOR
ARTHUR B. POOLE
BY Seymour, Carter + Nichols
ATTORNEYS

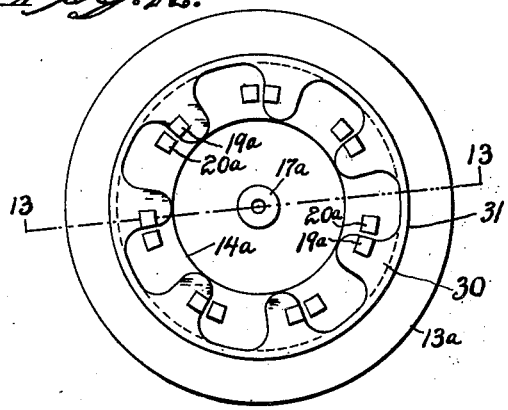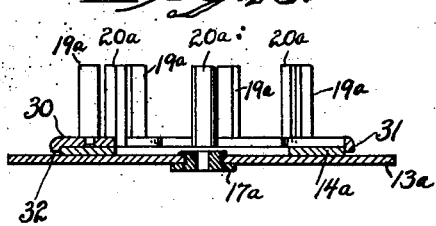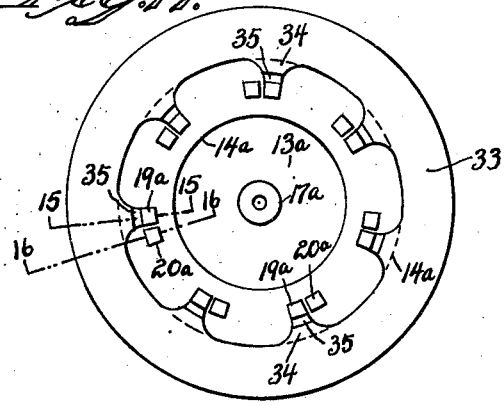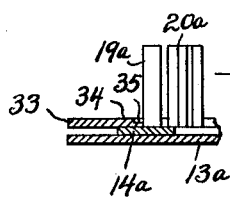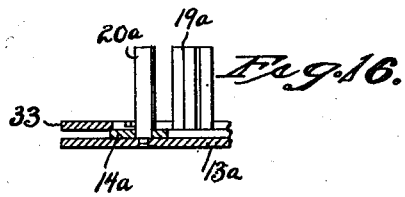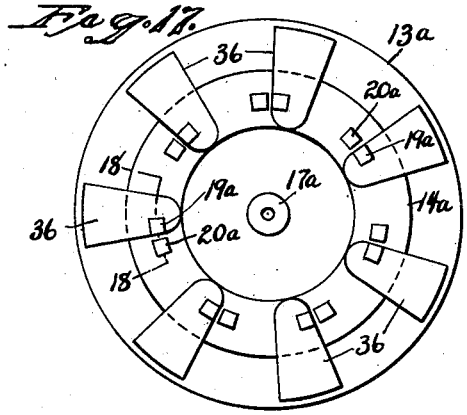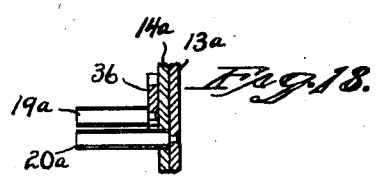

Patented Aug. 14, 1945

2,382,333

UNITED STATES PATENT OFFICE 2,382,333

SHADED-POLE SYNCHRONOUS ELECTRIC MOTOR

Arthur B. Poole, Harwinton, Conn.

Application May 3, 1944, Serial No. 533,835

6 Claims. (Cl. 172—278)

The present invention relates to improvements in synchronous electric motors and relates more particularly to synchronous electric motors of the type having pole-shading means in order to provide inherent starting torques. The starting torques referred to may be sufficient to bring the motor from "rest" up to synchronous speed or to merely give the rotor a directional trend.

The synchronous electric motors of the present invention are primarily adapted for use in driving clocks and other timing devices, and it may here be explained that in some instances it is desirable to provide sufficient starting torque to bring the motor from "rest" up to synchronous speed. In other instances, it is desirable to merely impart to the motor a directional trend but requiring outside aid to bring the motor up to synchronous speed. A common example of the latter type of use is in connection with manually-started synchronous electric clocks which are desired by some for the reason that interruptions in current will stop the clock and thereby indicate to the observer that a failure of current has occurred and that the time-indication is incorrect. Therefore, as used herein, "starting torque" is intended to include synchronous electric motors having merely a starting tendency or directional trend, as well as motors in which the starting torque is sufficient to bring the rotor from "rest" up to synchronous speed.

It may be further explained that as heretofore constructed, shaded-pole self-starting synchronous electric motors have usually had a much-greater flux-density in the unshaded pole-salients than existed in the shaded pole-salients. Various expedients have been attempted in efforts to provide somewhat comparable flux-densities in both the shaded and unshaded pole-salients.

One of the objects of the present invention is to provide a superior shaded-pole synchronous electric motor having a simple economical and reliable construction and arrangement of parts whereby the flux-density in shaded pole-salients will more nearly approach the flux-density in the complemental unshaded pole-salients.

A further object of the present invention is to provide a superior shaded-pole synchronous electric motor embodying single shading-means for shading a plurality of pole-salients and in which the construction and arrangement is such that the flux-density in the shaded pole-salients will approach the value of the flux-density in the complemental unshaded pole-salients.

Another object is to provide a superior shaded-pole synchronous electric motor having the parts so constructed and arranged that it is not necessary to cut away portions of the shading-means in order to clear pole-salients which it is not desired to shade.

With the above and other objects in view, as will appear to those skilled in the art from the present disclosure, this invention includes all features in the said disclosure which are novel over the prior art and which are not claimed in any separate application.

In the accompanying drawings, in which certain modes of carrying out the present invention are shown for illustrative purposes:

Fig. 6 is a perspective view of one of the complete pole-units;

Fig. 7 is a similar view of the inner pole-plate of the pole-unit of Fig. 6, together with its set of unshaded pole-salients;

Fig. 8 is a perspective view of the outer pole-plate, together with its set of shaded pole-salients, and showing the complemental shading-ring in place thereon;

Fig. 9 is a perspective view of the shading-ring;

Fig. 10 is a similar view of the outer pole-plate, together with its set of pole-salients;

Fig. 11 is a perspective view of a modified form of inner pole-plate, together with its set of pole-salients;

Fig. 12 is a view looking toward the inner face of a modified form of pole-unit suitable for use in motors of the present invention;

Fig. 13 is a transverse sectional view taken on the line 13—13 of Fig. 12;

Fig. 14 is a view similar to Fig. 12 but showing still another form of pole-unit constructed in accordance with the present invention;

Fig. 15 is a broken detailed sectional view taken on the line 15—15 of Fig. 14;

Fig. 16 is a similar view taken on the line 16—16 of Fig. 14;

Fig. 17 is a view similar to Figs. 12 and 14 but showing still another form of pole-unit embodying the present invention; and Fig. 18 is a broken detailed sectional view taken on the line 18—18 of Fig. 17.

Figure 1:
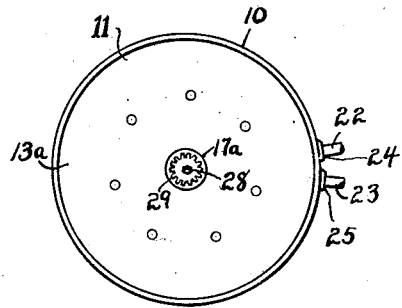
Fig. 1 is a face view of a shaded-pole synchronous electric motor embodying the present invention.

The structure of Figs. 1 to 10 inclusive

The particular shaded-pole synchronous electric motor chosen for purposes of illustrating one form of the present invention in the figures referred to, includes a tubular casing 10 and two opposed complemental pole-units respectively generally designated by the reference characters 11 and 12. The pole-units 11 and 12 are arranged in opposition and are respectively located within the opposite ends of the casing 10, to which latter they may be welded, brazed or otherwise secured in place.

The pole-unit 11 includes an outer pole-plate 13a of disk-like form and so fitted within the adjacent end of the tubular casing 10 as to have its outer periphery tightly engaged with the inner surface of the said casing. Located against the inner face of the outer pole-plate 13a is a ring-like shading-plate 14a of such diameter as to have its outer periphery spaced far inwardly from the inner surface of the casing 10. Located in turn against the inner face of the shading-plate 14a is an inner ring-like pole-plate 15a of such size as to have its outer periphery located slightly inwardly from the adjacent inner surface of the casing 10 so as to provide an annular gap 16a (Figs. 3, 4 and 5) for purposes as will hereinafter appear.

The casing 10, outer pole-plate 13a and the inner pole-plate 15a are formed of soft iron, silicon steel, or other suitable magnetic material, while the shading-plate 14a is preferably formed of copper or other high-electroconductive material.

Mounted centrally in the outer pole-plate 13a is a bearing-bushing 17a formed of brass or other suitable antifriction material.

The inner pole-plate 15a is formed with seven (more or less) inwardly-projecting arms 18a, each of which has riveted or otherwise secured to it, adjacent one lateral edge, the outer end of one of seven (more or less) bar-like pole-salients 19a extending in a direction parallel with the axis of the motor-structure and having their inner ends located adjacent but clear of the complemental pole-unit 12.

Located closely adjacent to and extending parallel with the pole-salients 19a are a second set of seven (more or less) bar-like pole-salients 20a, each of which extends through a suitable perforation in the shading-plate 14a and is riveted or otherwise secured, to the outer pole-plate 13a.

The bar-like pole-salients 19a and 20a above referred to are formed of soft iron, silicon steel, or other suitable magnetic material, and are arranged around the central axis of the motor-structure at equidistant points therefrom, to thus form an annular series of pole-salients, between each adjacent pair of which exists a circumferential gap (Fig. 6) for purposes as will hereinafter appear.

The pole-unit 12 above referred to corresponds generally to the pole-unit 11, and includes an outer pole-plate 13b, a shading-plate 14b, and an inner pole-plate 15b. The elements 13b, 14b and 15b just referred to, generally correspond to the elements 13a, 14a and 15a, though they are arranged in opposition thereto, as is especially well shown in Figs. 3 and 5. The associated features of the elements 13b, 14b and 15b just referred to are generally the same as the features associated with the elements 13a, 14a and 15a, and bear like reference characters, save for the subscript b replacing the subscript a.

Figure 4:
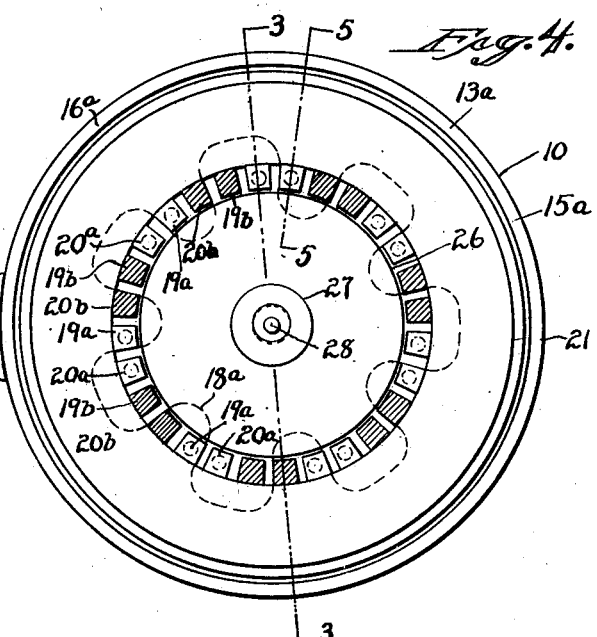
Fig. 4 is a transverse sectional view taken on the line 4—4 of Fig. 3.

The pole-units 11 and 12 are oriented with respect to each other so that a given pair of pole-salients 19a and 20a fit into the circumferential gap between two adjacent pairs of pole-salients 19b and 20b, so that the net result of the arrangement is that two pole-salients of the pole-unit 11 alternate with two pole-salients of the pole-unit 12, all as is shown in Fig. 4.

Figure 2:
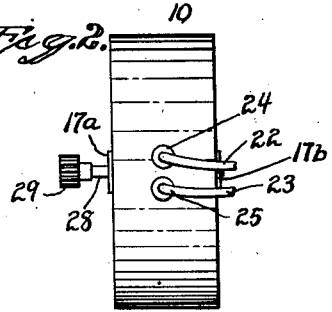
Fig. 2 is an edge view thereof.
Figure 3:
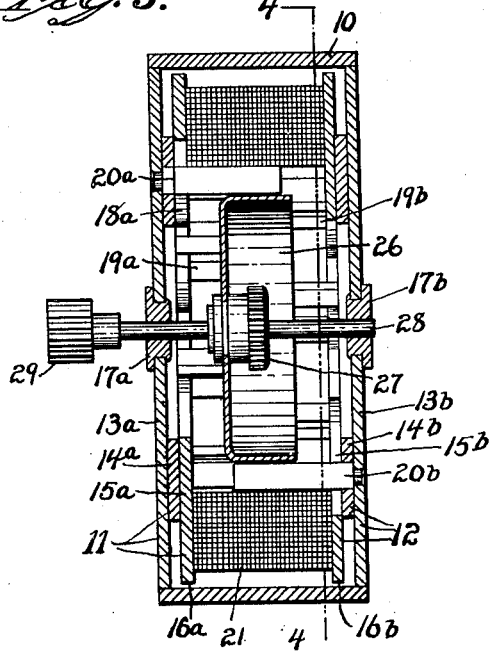
Fig. 3 is a central sectional view taken on the line 3—3 of Fig. 4.
Figure 5:
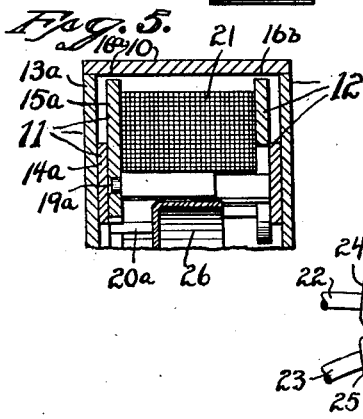
Fig. 5 is a broken view in transverse section taken on the line 5—5 of Fig. 4.

Surrounding the annular series of pole-salients 19a, 19b, 20a and 20b is a ring-like energizing-coil 21 located within the casing 10 so as to impart opposite instantaneous polarities respectively, to the pole-units 11 and 12. The said energizing-coil 21 is provided with two complemental terminal-leads 22 and 23 respectively extending outwardly through insulating-bushings 24 and 25 mounted in the periphery of the casing 10, as is shown in Figs. 1, 2 and 4. The terminal-leads 22 and 23 may be connected to a suitable source of alternating current such, for instance, as 115-volt 60-cycle alternating current.

Mounted axially within the cage-like structure provided by the annular series of pole-salients 19a, 19b, 20a and 20b, is a cup-shaped rotor 26 having a hub 27 and rigidly mounted upon a rotor-shaft 28. The said rotor-shaft 28 bears at its respective opposite ends in the bearing-bushings 17a and 17b and is provided at one of its ends exteriorly of the motor-structure, with a drive-pinion 29 adapted to be connected to any suitable clock or timing-device, to drive or control the operation thereof, in a manner well understood in the art.

The rotor 26 above referred to is, in the particular instance shown, of the so-called "hysteresis" type and is formed of permanent magnet material, in accordance with well known practice in the art. The detail character of the rotor employed, however, is of no great importance, inasmuch as there are available in the art many types of rotors which might be employed in conjunction with the stator-structure having the characteristics herein set forth to provide a synchronous electric motor.

The operation of the structure of Figs. 1 to 10 inclusive

When the terminal-leads 22 and 23 of the energizing-coil 21 are connected to a suitable source of alternating current, the casing 10 and the pole-units 11 and 12 will be magnetized, so that at any given instant the two said pole-units will have opposite polarities respectively. Inasmuch as the effect of each of the said pole-units 11 and 12 upon the rotor 26 or its equivalent, is substantially identical, a discussion of the flow of magnetic flux in one of the said units will serve for both.

When the energizing-coil 21 is supplied with alternating current as before described, the magnetic flux thus generated will flow from the adjacent end of the tubular casing 10 across the air-gap 16a into the inner pole-plate 15a and thence through the unshaded pole-salients 19a thereof to the rotor 26. From the said rotor the flux will flow mainly to the unshaded pole-salients 19b of the pole unit 12 and back across the air-gap 16b to the casing 10.

At the same time that flux is flowing across the air-gap 16a as before described, flux of like polarity will be flowing directly into the outer pole-plate 13a, through which latter the flux will be distributed to each of the seven shaded pole-salients 20a. From the pole-salients 20a, the flux will flow through the adjacent portions of the rotor 28 mainly into the shaded pole-salients 20b and thence through the outer pole-plate 13b back into the casing 10. Owing to the fact that the flux flowing from the outer pole-plate 13a into each of its pole-salients 20a will be caused to pass through the shading-plate 14a, the effect of the shading-plate 14a will be to cause the flux in the said group of pole-salients 20a to lag substantially 90 electrical degrees behind the flux in the unshaded complemental pole-salients 19a which are supplied with flux through the inner pole-plate 15a.

Due to the presence of the air-gaps 16a or 16b or their equivalent, the flux-density actually reaching the unshaded pole-salients 19a may be kept down to a value closely approaching that supplied to the inner portions of the pole-salients 20a, despite the choking effect of the shading-plate 14a upon the flux flowing to the said pole-salients 20a.

By providing separate flux-feeding means, such as the outer pole-plate 13a and the inner pole-plate 15a respectively for the shaded and unshaded pole-salients in the type of motor here concerned, it is possible to impress upon the said pole-salients the desired flux-density without requiring the cutting out of portions of the shading-plate 14a or its equivalent, in order to clear the unshaded pole-salients.

The structure of Fig. 11

Instead of spacing the outed edge of the inner pole-plates entirely clear of the casing 10 as in the structure above described, an inner pole-plate such as 29a (Fig. 11) may be employed. The said pole-plate is provided upon its outer periphery with seven (more or less) flux-conducting fingers 29b which are adapted to engage or substantially engage with the inner surface of the casing 10.

The structure of Figs. 12 and 13

In Figs. 12 and 13 is shown a pole-unit which has the same basic characteristics as the pole-unit 11 before described and may be used in place thereof. This modified form of pole-unit includes an outer pole-plate 13a having a central bearing-bushing 17a and also having superimposed upon its inner face a shading-plate 14a. The outer pole-plate 13a also has its complement of shaded pole-salients 20a.

Instead of employing an inner pole-plate such as 15a which is of sufficient diameter to closely approach the inner periphery of the casing 10, the pole-unit of Figs. 12 and 13 substitutes an inner pole-plate 30 which is formed around its periphery with an annular flange 31 turned toward the inner face of the outer pole-plate 13a but separated therefrom by an annular gap 32.

When a motor-structure embodying the pole-unit shown in Figs. 12 and 13 is energized, the flux will flow directly inwardly through the outer pole-plate 13a to its complement of shaded pole-salients 20a. The desired density of flux will reach the unshaded pole-salients 19a by crossing the gap 32 to the flange 31 of the inner pole-plate 30 and then through the said pole-plate to the said unshaded pole-salients 19a.

Thus, in the structure illustrated in Figs. 12 and 13 separate flux-paths are provided for each of the resepective groups of shaded and unshaded pole-salients.

The structure of Figs. 14, 15 and 16

The pole-unit here illustrated includes, as in the prior forms, an outer pole-plate 13a and a shading-plate 14a, as well as unshaded pole-salients 19a and shaded pole-salients 20a. The unshaded pole-salients 19a may be spot-welded or brazed to the adjacent face of the shading-plate 14a.

Instead, however, of utilizing an inner pole-plate like 15a or 30 before described, an inner pole-plate 33 is employed which has an outside diameter substantially corresponding to the outside diameter of the outer pole-plate 13a and adapted to tightly fit within a casing such as 10.

The inner pole-plate 33 is formed with a number of inwardly-projecting arms 34 corresponding to the number of unshaded pole-salients 19a and respectively spaced so that a given arm 34 registers or aligns with one of the pole-salients 19a. At its inner end, each of the arms 34 is reduced in thickness to provide a finger 35 engaging, or substantially engaging, at its inner end the adjacent one of the unshaded pole-salients 19a. In this manner, the flux directly reaching the unshaded pole-salients 19a is restricted to achieve substantially the same effect as was achieved in the structures of the preceding figures.

The structure of Figs. 17 and 18

The modified form of pole-unit illustrated in Figs. 17 and 18 includes an outer pole-plate 13a and a shading-plate 14a, together with the before-described annular series of alternating unshaded and shaded pole-salients 19a and 20a.

In the structure here shown, there is substituted for a single inner pole-plate such as is shown in the structures of the preceding figures, an annular series of inner pole-plates 36 which may be spot-welded or brazed to the adjacent face of the shading-plates 14a or 14b. In the instance shown, the inner pole-plates 36 are seven in number and correspond to the number of unshaded pole-salients. Each of the said inner pole-plates 36 has riveted or otherwise secured to it, one of the aforesaid unshaded pole-salients 19a.

It will be noted by reference to Fig. 17 in particular, that the respective outer edges of the inner pole-plates 36 terminate short of the corresponding edge of the outer pole-plate 13a, so as to provide a gap which will serve in a manner previously described in connection with the other structures, to restrict or lessen the flux-density applied to the unshaded pole-salients 19a.

Résumé

It will be noted from the foregoing and by reference to the accompanying drawings, that all of the forms of pole-units have a common characteristic inasmuch as they each provide a separate and distinct flux-conducting means respectively serving the shaded and unshaded pole-salients.

It will further be noted that in all forms of the pole-units herein considered, provision is made whereby the reluctance of the total flux-paths leading from the casing 10 or its equivalent, to the unshaded pole-salients is greater than the reluctance of the flux-path from the casing 10 to the shaded pole-salients.

The invention may be carred out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. A shaded-pole synchronous electric motor, including in combination: a ring-shaped energizing-coil; a pair of opposed plate-like pole-units respectively located at the opposite ends of the said ring-like energizing-coil; flux-bridging means extending across the outer periphery of the said energizing-coil and magnetically interconnecting the two said plate-like pole-units; and a rotor mounted for rotation substantially concentrically with respect to the said energizing-coil in poistion to be magnetically actuated by flux in both of the said pole-units; at least one of the aforesaid pole-units comprising an outer pole-plate extending crosswise of the adjacent end of the said energizing-coil in position to receive flux from the aforesaid flux-bridging means, a shading-plate located inwardly of the said outer pole-plate and extending substantially parallel therewith, an inner pole-plate located inwardly with respect to and extending substantially parallel with the said shading-plate, an annular series of pole-salients extending inwardly from the said outer pole-plate through the said shading-plate into a position adjacent the said rotor, and a second annular series of pole-salients extending inwardly from the said inner pole-plate in circumferentially-alternating spaced relationship with respect to the pole-salients extending inwardly from the said outer pole-plate, the said inner pole-plate having clearance-gaps between its inner portion and the pole-salients which extend inwardly from the said outer pole-plate, which clearance-gaps exceed the distance between a given one of the pole-salients of one of the said pole-plates and the next adjacent pole-salient of the other of said pole-plates.

2. A shaded-pole synchronous electric motor as set forth in claim 1 and having the said inner pole-plate constructed and arranged to provide a flux-path having a greater reluctance than the reluctance of the flux-path provided by the said outer pole-plate.

3. A shaded-pole synchronous electric motor as set forth in claim 1 and in which the diameter of the said inner pole-plate is less than the diameter of the said outer pole-plate, to thereby provide a flux-path of greater reluctance to the pole-salient extending inwardly from the said inner pole-plate than the reluctance of the flux-path provided by the said outer pole-plate to its pole-salient.

4. A shaded-pole synchronous electric motor, including in combination: a ring-shaped energizing-coil; a pair of opposed plate-like pole-units respectively located at the opposite ends of the said ring-like energizing-coil; flux-bridging means extending across the outer periphery of the said energizing-coil and magnetically interconnecting the two said plate-like pole-units; and a rotor mounted for rotation substantially concentrically with respect to the said energizing-coil in position to be magnetically actuated by flux in both of the said pole-units; each of the aforesaid opposed pole-units comprising an outer pole-plate extending crosswise of the adjacent end of the said energizing-coil in position to receive flux from the aforesaid flux-bridging means, a shading-plate located inwardly of the said outer pole-plate and extending in substantial parallelism therewith, an inner pole-plate located inwardly with respect to and extending substantially parallel with the said shading-plate, an annular series of pole-salients extending inwardly from the said outer pole-plate through the said shading-plate into a position adjacent the said rotor and in a direction opposite to the similar pole-salients of the other pole-unit, and a second annular series of pole-salients extending inwardly from the said inner pole-plate in circumferentially-alternating spaced relationship with respect to the pole-salients extending inwardly from the said outer pole-plate, the said inner pole-plate having clearance-gaps between its inner portion and the pole-salients which extend inwardly from the said outer pole-plate, which clearance-gaps exceed the distance between a given one of the pole-salients of one of the said pole-plates and the next adjacent pole-salient of the other of said pole-plates.

5. A shaded-pole synchronous electric motor as set forth in claim 4 and having the inner pole-plate of each of the opposed pole-units constructed and arranged to provide a flux-path having a greater reluctance than the reluctance of the flux-path provided by its complemental outer pole-plate.

6. A shaded-pole synchronous electric motor as set forth in claim 4 and in which the diameter of the inner pole-plate of each of the said opposed pole-units is less than the diameter of its complemental outer pole-plate, to thereby provide a flux-path of greater reluctance to the annular series of pole-salients extending inwardly from the said inner pole-plate than the reluctance of the flux-path provided by its complemental outer pole-plate to the pole-salients projecting inwardly from the latter.

ARTHUR B. POOLE.